US009152357B2

(12) United States Patent
Hwang et al.

(10) Patent No.: US 9,152,357 B2
(45) Date of Patent: Oct. 6, 2015

(54) METHOD AND SYSTEM FOR PROVIDING PRINT CONTENT TO A CLIENT

(75) Inventors: Peter G Hwang, Vancouver, WA (US); Terence C Ngai, San Diego, CA (US); Jerry J Liu, Sunnyvale, CA (US); Suk Hwan Lim, Mountain View, CA (US); Eamonn O'Brien-Strain, San Francisco, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 845 days.

(21) Appl. No.: 13/032,824

(22) Filed: Feb. 23, 2011

(65) Prior Publication Data
US 2012/0212772 A1   Aug. 23, 2012

(51) Int. Cl.
*G06F 3/12*   (2006.01)

(52) U.S. Cl.
CPC ............ *G06F 3/1206* (2013.01); *G06F 3/1271* (2013.01); *G06F 3/1287* (2013.01)

(58) Field of Classification Search
CPC .................................................... G06F 3/1271
See application file for complete search history.

(56) References Cited

U.S. PATENT DOCUMENTS

| | | | |
|---|---|---|---|
| 6,029,182 A * | 2/2000 | Nehab et al. ................. | 715/205 |
| 6,975,419 B2 | 12/2005 | Staas et al. | |
| 7,065,497 B1 | 6/2006 | Brewster et al. | |
| 7,225,401 B2 | 5/2007 | Purvis | |
| 7,249,319 B1 * | 7/2007 | Payne et al. ................... | 715/209 |
| 7,290,285 B2 | 10/2007 | McCurdy et al. | |
| 7,302,423 B2 | 11/2007 | De Bellis | |
| 7,386,791 B2 | 6/2008 | Jacobson | |
| 7,565,350 B2 | 7/2009 | Fetterly et al. | |
| 7,617,446 B2 | 11/2009 | Dutta | |
| 7,711,747 B2 | 5/2010 | Renders et al. | |
| 7,720,835 B2 | 5/2010 | Ward et al. | |
| 7,769,751 B1 | 8/2010 | Wu et al. | |
| 7,861,165 B2 | 12/2010 | Stevenson | |
| 7,996,000 B1 | 8/2011 | Dubinko et al. | |
| 8,020,090 B2 | 9/2011 | Chen et al. | |
| 8,046,681 B2 | 10/2011 | Vydiswaran et al. | |
| 8,479,092 B1 | 7/2013 | Pandey | |
| 8,593,666 B2 | 11/2013 | Xiao | |

(Continued)

FOREIGN PATENT DOCUMENTS

| | | |
|---|---|---|
| CN | 101329687 A | 12/2008 |
| CN | 102073728 A | 5/2011 |

(Continued)

OTHER PUBLICATIONS

Printable Web Pages on the Fly! (Web Page) http ://www.printer-friendly.com/2008011945/java/web2printer.html.

(Continued)

*Primary Examiner* — Ming Hon
*Assistant Examiner* — Vincent Peren
(74) *Attorney, Agent, or Firm* — Van Cott, Bagley, Cornwall & McCarthy

(57) ABSTRACT

A request for print content is received at a network server system. The request includes variable user input. Webpage content is obtained based at least in part on the variable user input. A subset of the webpage content is identified as print content. A print-ready layout of the print content is formed and the print content in the print-ready layout is provided, via network connection, to a client in response to the request.

15 Claims, 4 Drawing Sheets

(56) References Cited

U.S. PATENT DOCUMENTS

| | | | |
|---|---|---|---|
| 8,645,369 B2 | 2/2014 | Poblete et al. | |
| 8,683,379 B2 | 3/2014 | LuVogt et al. | |
| 8,713,438 B1 | 4/2014 | Broniek et al. | |
| 8,745,091 B2 | 6/2014 | McHenry et al. | |
| 2002/0078045 A1* | 6/2002 | Dutta | 707/7 |
| 2002/0123988 A1* | 9/2002 | Dean et al. | 707/3 |
| 2003/0142801 A1 | 7/2003 | Pecht | |
| 2003/0210424 A1 | 11/2003 | Sandfort et al. | |
| 2004/0185882 A1 | 9/2004 | Gecht et al. | |
| 2004/0249934 A1 | 12/2004 | Anderson | |
| 2004/0252332 A1* | 12/2004 | McCoog et al. | 358/1.15 |
| 2005/0120311 A1* | 6/2005 | Thrall | 715/811 |
| 2005/0138065 A1 | 6/2005 | Ciriza | |
| 2005/0154718 A1* | 7/2005 | Payne et al. | 707/3 |
| 2006/0033950 A1 | 2/2006 | Nakamura | |
| 2006/0048053 A1 | 3/2006 | Sembower et al. | |
| 2006/0123114 A1 | 6/2006 | Aoki et al. | |
| 2006/0125820 A1 | 6/2006 | Turcan et al. | |
| 2006/0143286 A1 | 6/2006 | Aoki et al. | |
| 2006/0167862 A1 | 7/2006 | Reisman | |
| 2006/0173985 A1 | 8/2006 | Moore | |
| 2006/0277482 A1 | 12/2006 | Hoffman et al. | |
| 2007/0027932 A1 | 2/2007 | Thibeault | |
| 2007/0047844 A1 | 3/2007 | Watanabe et al. | |
| 2007/0130509 A1 | 6/2007 | Gombert et al. | |
| 2007/0174298 A1 | 7/2007 | Tanimoto | |
| 2007/0220411 A1* | 9/2007 | Hauser | 715/500 |
| 2007/0247664 A1 | 10/2007 | Yamamoto | |
| 2008/0005250 A1 | 1/2008 | Oksum | |
| 2008/0005651 A1 | 1/2008 | Grefenstette et al. | |
| 2008/0030775 A1 | 2/2008 | Adachi et al. | |
| 2008/0046459 A1 | 2/2008 | Hinohara | |
| 2008/0068650 A1 | 3/2008 | Negoro | |
| 2008/0089709 A1 | 4/2008 | Higashi | |
| 2008/0097828 A1 | 4/2008 | Silverbrook et al. | |
| 2008/0147514 A1 | 6/2008 | Shuster et al. | |
| 2008/0307308 A1* | 12/2008 | Sullivan et al. | 715/723 |
| 2009/0002770 A1 | 1/2009 | Cavill et al. | |
| 2009/0013071 A1 | 1/2009 | Matoba et al. | |
| 2009/0030889 A1 | 1/2009 | Chatow et al. | |
| 2009/0119260 A1 | 5/2009 | Chopra et al. | |
| 2009/0171751 A1 | 7/2009 | Zhou et al. | |
| 2009/0310168 A1 | 12/2009 | Kunioka et al. | |
| 2009/0316198 A1 | 12/2009 | Takeuchi et al. | |
| 2010/0030768 A1 | 2/2010 | Poblete et al. | |
| 2010/0058204 A1 | 3/2010 | Wilson | |
| 2010/0069116 A1 | 3/2010 | Silverbrook et al. | |
| 2010/0145955 A1 | 6/2010 | McDonald et al. | |
| 2010/0281351 A1 | 11/2010 | Mohammed | |
| 2010/0328725 A1 | 12/2010 | Gaucas et al. | |
| 2011/0040823 A1 | 2/2011 | Liu et al. | |
| 2011/0078558 A1 | 3/2011 | Bao et al. | |
| 2011/0213894 A1 | 9/2011 | Silberstein et al. | |
| 2011/0235088 A1* | 9/2011 | Luo | 358/1.15 |
| 2012/0011021 A1* | 1/2012 | Wang et al. | 705/26.5 |
| 2012/0062935 A1 | 3/2012 | Kamath et al. | |
| 2012/0212772 A1 | 8/2012 | Hwang et al. | |
| 2012/0262754 A1 | 10/2012 | Hwang | |
| 2013/0010333 A1 | 1/2013 | Anand et al. | |
| 2013/0097102 A1 | 4/2013 | Revesz | |
| 2013/0103461 A1 | 4/2013 | Bhatia | |
| 2013/0185364 A1 | 7/2013 | Bhatia | |
| 2013/0222843 A1 | 8/2013 | Ganesan et al. | |
| 2014/0036303 A1 | 2/2014 | Vishwanath et al. | |
| 2014/0057238 A1 | 2/2014 | Okamoto et al. | |
| 2014/0122486 A1 | 5/2014 | Simard et al. | |
| 2014/0136541 A1 | 5/2014 | Farahat et al. | |
| 2014/0214632 A1 | 7/2014 | Garera et al. | |

FOREIGN PATENT DOCUMENTS

| | | |
|---|---|---|
| CN | 102253937 A | 11/2011 |
| EP | 0986213 | 5/2000 |
| WO | WO-2013048428 A1 | 4/2013 |
| WO | WO-2013159246 A1 | 10/2013 |

OTHER PUBLICATIONS

Luo, P. et al., "Web Article Extraction for Web Printing: a DOM+Visual based Approach," Hewlett-Packard Company, 9th ACM Symposium on Document Engineering, 2009.

Merrill, S., Read Any RSS Feed on Your Lexmark All-in-one Printer, Jul. 6, 2010, http://techcrunch.com/2010/07/06/read-any-rss-feed-on-your-lexmark-all-in-one-printer.

SPCURTIS81, "App Idea—Select Your Own RSS Feed for Scheduled Printing," HP Support Forums, Jul. 26, 2012, http://h30434.www.3.hp.com/t5/ePrint-Print-Apps-Mobile-Printing-and-ePrintCenter/App-Idea-Select-Your-Own-RSS-Feed-For Scheduled-Printing/td-p/1700391.

Wikipedia, "Delicious (website)," Jun. 4, 2012, http://web.archive.org/web/20120604165352/https://en.wikipedia.org/wiki/Delicious_(website).

Wikipedia, "Google bookmarks," Mar. 7, 2012, http://web.archive.org/web/20120307041604/http://en.wikipedia.org/wiki/Google_Bookmarks.

Chen, Y. et al., "Improve on Frequent Access Path Algorithm in Web Page Personalized Recommendation Model," (Research Paper), 2011 International Conference on Information Science and Technology (ICIST), Mar. 2011, 4 pages, found at http://ieeexplore.ieee.org/stamp/stamp.jsp?arnumber=5765216.

Formatdynamics, "Print or PDF with CleanPrint," Sep. 29, 2014, found at https://chrome.google.com/webstore/detail/print-or-pdf-with-cleanpr/fklmmmdcofimkjmfjdnobmmgmefbap.

International Search Report & Written Opinion received in PCT Application No. PCT/CN2012/000569, Feb. 7, 2013, 6 pages.

Kim, S-M. et al., "Improving Web Page Classification by Label-propagation Over Click Graphs," (Research Paper), Nov. 2-6, 2009, available at http://wvvw.patrickpantel.com/download/papers/2009/cikm09c.pdf.

Quora, "What are good examples of machine learning enhanced with human intervention in e-commerce?" 2011, found at http://www.quora.com/What-are-good-examples-of-machine-learning-enhanced-with-human-intervention-in-e-commerce.

Tsukada, M. et al., "Automatic Web-Page Classification by Using Machine Learning Methods," Web Intelligence: Research and Development, Springer Berlin Heidelberg, 2001.

Hewlett-Packard Development Company, L.P.; "HP ePrintCenter." Aug. 28, 2011; Help and Tips; (web page); <http://web.archive.org/web/20110828234332/http://b30495.www3.hp.com/help>.

* cited by examiner

METHOD AND SYSTEM FOR PROVIDING PRINT CONTENT TO A CLIENT

BACKGROUND

Printing content from the World Wide Web (or simply "the web") is becoming increasingly common. Print apps are software applications that allow a user of a web-connected printer to download and print content designed for the selected print app. For example, a user may select a print app designed to provide children's coloring pages which are updated on a periodic basis. Thus, by executing the print app, the user is able to print coloring pages directly via the print app without the need to connect the printer to another device such as a computer.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As discussed above, print apps provide easy access to print content from the web. However, such print content is limited by the number of available print apps. For example, as mentioned above, there may exist a print app for children's coloring pages, but that print app may only include coloring pages of princesses and fairies. Thus, if a user desires to print children's coloring pages of animals, for example, the user may be unable to do so if there is no print app specifically designed for that purpose. Accordingly, various embodiments described herein facilitate the generation of print content on the fly in response to a user-submitted search. In other words, embodiments described herein allow a user to submit a search query (e.g., by typing text) for specific content. In response to the search query, print content specific to the search query is provided to the user for printing. As an example of various embodiments, a user can submit a search query for children's coloring pages that include farm animals and receive multiple options of farm animal print content that can be selected for printing.

Figure 1:
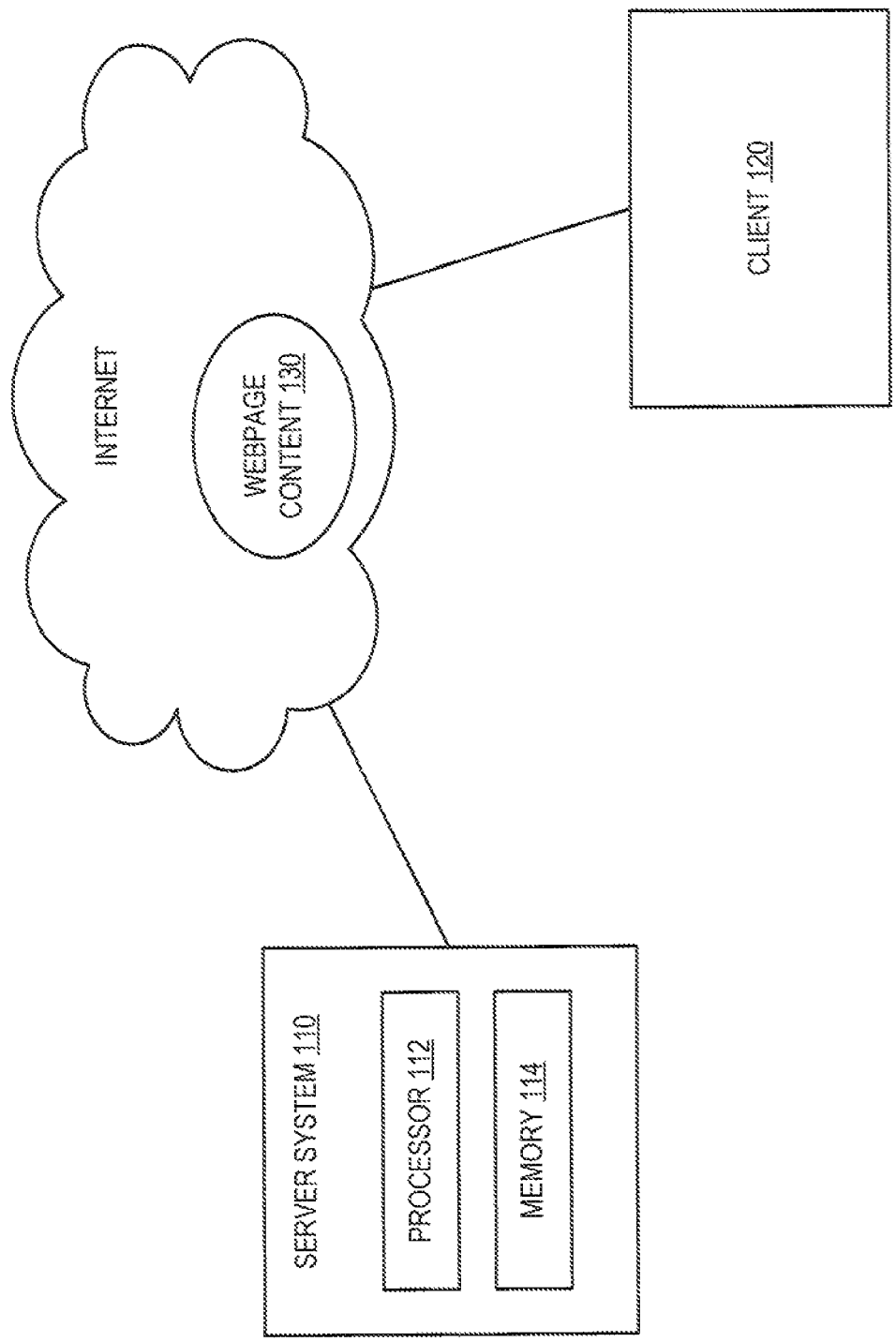
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Server system 110 is connected to the World Wide Web (WWW) via the Internet. Server system 110 receives a request for print content from a user. As used herein, "print content" refers to any content that is suitably formatted for printing. In some embodiments, print content may be limited to a subset of webpage content determined to be relevant for printing search query, which is described in more detail below. The request may originate from a web browser (e.g., running on a desktop, notebook or other computing device), a mobile device, a printer or other suitable web-connected computing device. In various embodiments, the request includes variable user input, which is defined herein to include search strings received via text input, voice command, or other suitable mechanism. For example, a search box may be presented to the user and the user's input into the search box (e.g., typing the string "basketball statistics for Reggie Lewis") is considered variable user input.

Based on the variable user input received by server system 110, server system 110 obtains webpage content 130 (as used herein, webpage content 130 may include one or more web pages). For example, server system 110 may employ a search engine (e.g., proprietary or third-party search engine) to retrieve search results (e.g., in the form of webpage content) based on the variable user input. In some embodiments, server system 110 pre-fetches webpage content 130 (e.g., based on past usage history) and processes the content prior to receiving user input. Server system 110 identifies a subset of webpage content 130 as print content. In some embodiments, server system 110 leverages HP Smart Print technology, offered by Hewlett Packard Company of Palo Alto, Calif, to determine print content from webpage content 130 (HP Smart Print technology automatically determines the area of a webpage it thinks the user would like to print (e.g., filters out ads, blank spaces, etc. to save ink and paper for the user)). In one example, obtaining webpage content includes aggregating webpage content from a database of user-provided webpage content associated with the variable user input, performing a World Wide Web (WWW) search based on the variable user input, or a combination thereof.

Using the identified print content, server system 110 forms a print-ready layout of the print content. As used herein, "print-ready" refers to the formatting of print content such that it can be recognized by a printer. For example, print-ready content may be formatted according to a page description language (PDL) such as, but not limited to, PostScript (offered by Adobe Systems, Incorporated of San Jose, Calif.) and Printer Command Language (offered by Hewlett Packard Company). The print-ready layout may include various optimizations (e.g., maximizing the amount of content on a single page, logically organizing the content on the page, etc.).

Server system 110 provides the print content in the print-ready layout to client 120. Client 120 can be a web-browser, a mobile device, a web-connected printer, or other suitable computing device. Client 120 may be the source of the original print request, but it is not necessary. For example, a user may access a printing profile and submit a search request from a web browser (which is sent to server system 110). In response, server system 110 may provide the print content in the print-ready layout to a printer that is associated with the printing profile from which the request was received. In another example, a user may submit a search request to server system 110 directly from a printer. In response, server system 110 provides the requested print content back to the printer for printing.

In some embodiments, server system 110 may provide multiple options of print content to client 120. Thus, in yet another example, a user might submit a search request from a mobile device and receive multiple options of print content in print-ready layouts from which to select. The user could then select one of the provided options, which causes server system 110 to provide the selected print content to a printer (e.g., associated with the user profile, mobile device, etc.).

The functions and operations described with respect to server system 110 may be implemented as a computer-readable storage medium containing instructions executed by a processor (e.g., processor 112) and stored in a memory (e.g., memory 114).

Figure 2:
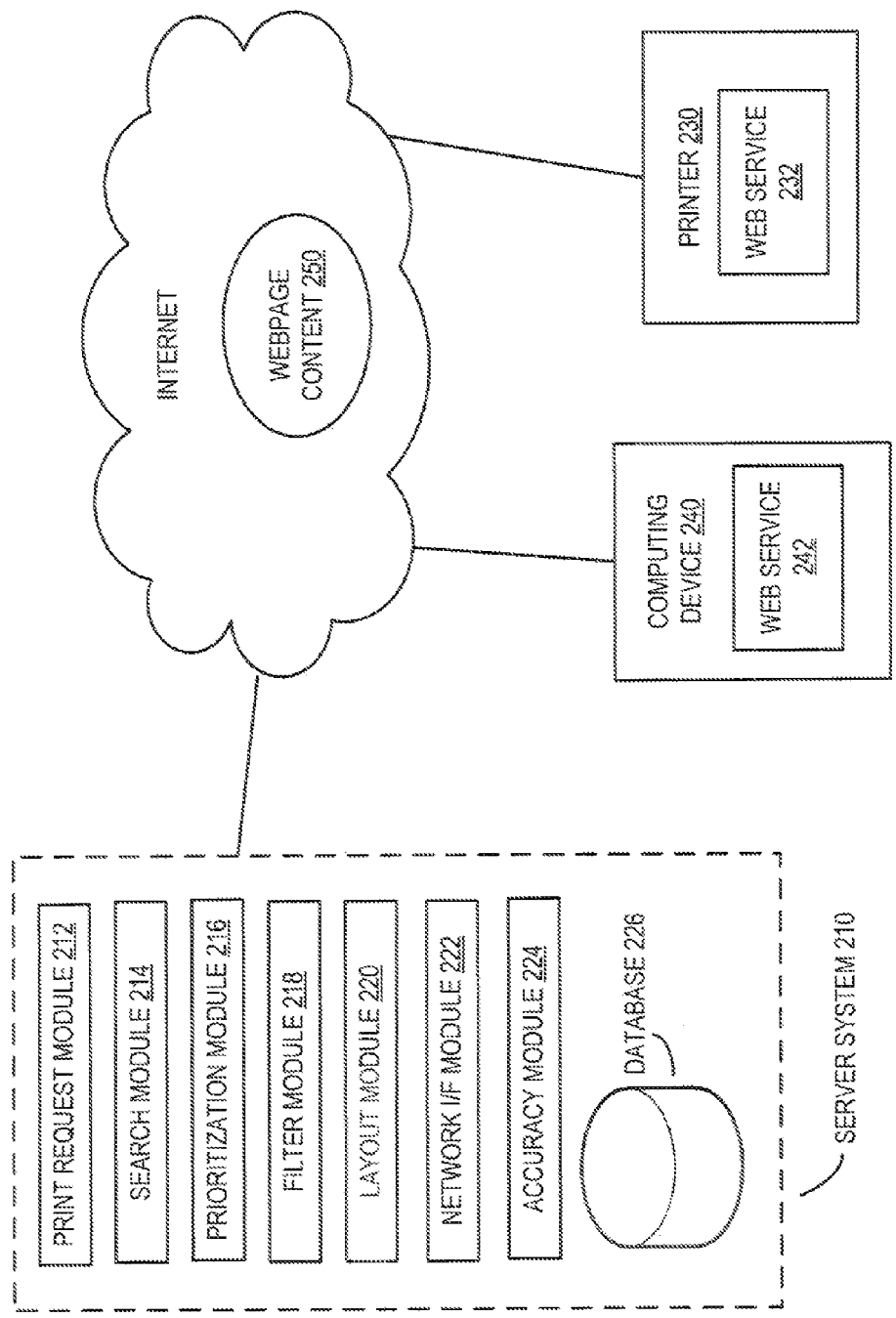
FIG. 2 is a block diagram illustrating a system according to various embodiments.

FIG. 2 is a block diagram that includes a server system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

As illustrated in FIG. 2, server system 210 may be a single physical device or it may be distributed among multiple physical devices connected over a network (e.g., the Internet). For example, server system 210 may represent a cloud computing infrastructure (i.e., the cloud). In a cloud computing infrastructure, various components/modules of server system 210 may share resources and/or act in concert even though they might be in different physical locations and/or operating on different physical devices.

Print request module 212 receives a request for print content according to search parameters submitted by a user. Search parameters might be submitted by a user typing text, using voice commands, or other suitable input mechanisms (e.g., from a web browser, a mobile device, directly from a printer, etc.). Search module 214 obtains webpage content based on the user-submitted search parameters. For example, if a user enters "yoga poses" into a search box and submits the request, search module 214 commences a search for webpage content related to yoga poses. Search module 214 might itself be a search engine that searches the World Wide Web for content or search module 214 might employ a third-party search engine (e.g., Google Search, available from Google, Inc. of Mountain View, Calif.) to search for content related to yoga poses. The obtained content might include webpages with descriptions of yoga poses or webpages with images of yoga poses or some combination of these.

Content related to a particular search may span multiple pages on a website. Using the example of yoga poses again, a particular website might have an article that spans three or four pages with each page illustrating multiple yoga poses. A user viewing the article might simply click the "next" button to advance to each successive page in the article. In various embodiments, search module 214 automatically traverses the links to additional pages to obtain all of the content associated with the article.

Prioritization module 216 prioritizes retrieved webpage content 250 based on the search parameters. Webpage content 250 may be prioritized based on relevance (e.g., statistical relevance), popularity (e.g., from user-ratings, etc.), printability (e.g., likelihood of producing a high-quality print based on location of content on the webpage, HTML page structure, image resolution, etc.), or some combination of these factors. For example, prioritization module 216 might combine a relevancy score (e.g., from the Google Search API) with a frequency score (e.g., from HP Advanced Smart Print technology) to statistically determine the most appropriate content. Thus, search module 214 may obtain a large number of search results. Prioritization module 216 may then determine the top results, within a threshold, based on one or more of the factors described above. In various embodiments, search results not falling within the top results threshold are thrown out and/or ignored.

Given the top results, filter module 218 extracts print content from the webpage content 250. In other words, unwanted content (e.g., ads, blank spaces, redundant information, etc.) is filtered out. Filter module 218 may use HP Smart Print technology or similar technology to automatically determine which areas of a webpage are relevant for printing. The extracted print content is passed to layout module 220 which arranges the print content according to a print-ready layout.

Layout module 220 optimizes the layout of the print content based on relevance of the print content, popularity of the print content, printability of the print content and/or other suitable factors. In certain embodiments, layout module 220 creates a mash-up of content from different sources in a layout on a single page.

Network interface module 222 provides a plurality of choices of print content (in print-ready layout(s)) to a client (e.g., printer 230, computing device 240) in response to the print request. The client to which the print content is provided may be the same client from which the request was originally sent, although this is not necessary. For example, the original search request for print content may be sent from computing device 240 to server system 210 by way of web-service 242. Web-service 242 may include a user login that ties the service to a user profile. The user-profile may be linked to printer 230. Thus, upon processing the request from computing device 240, server system 210 may provide the plurality of choices of print content to computing device 240 for previewing and/or selecting by the user. Upon receiving a selection from the user, server system 210 sends the selected print content in the print-ready layout to printer 230 for printing. In other embodiments, the choices of print content are provided directly to printer 230 for selection and printing. In yet other embodiments, the original search request for print content is sent from printer 230 to server system 210 by way of web-service 232. Server system 210 returns the plurality of choices of print content back to printer 230 in response. In addition, the plurality of choices of print may also be archived in database 226.

Database 226 stores data associated with a users' selection of one of the plurality of choices of print content. For example, database 226 may store the search parameters submitted by the user along with information about the webpage selected by the user when provided with print content options. Accuracy module 224 analyzes the data in the database to improve the relevance of print content provided in response to future requests for print content. For example, prioritization module 216 might rank the top three search results as A, B, and C a particular search. However, if users performing the same or similar search consistently choose to print option C over options A and B, accuracy module 224 uses this information to increase the rank of option C (e.g., moving C from the number three ranking to the number one ranking). Thus, in future searches having the same or similar search parameters, server system 210 might then provide option C as the top option.

Various modules and/or components illustrated in FIG. 2 may be implemented as a computer-readable storage medium containing instructions executed by a processor and stored in a memory for performing the operations and functions discussed herein.

Figure 3:
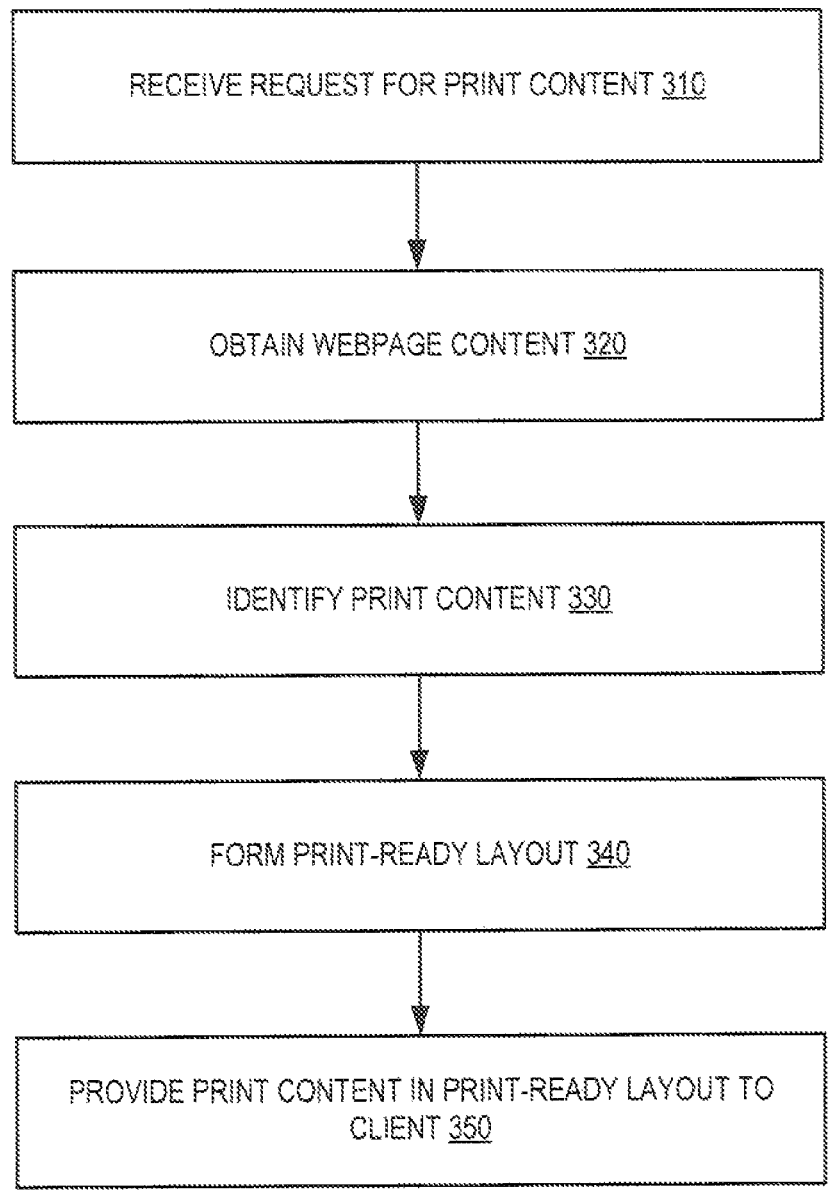
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A server system receives 310 a request for print content that includes variable user input. The server system can be a single server or it can be a distributed group of servers (e.g., as part of a cloud computing infrastructure). As discussed herein, the variable user input can be a search string (e.g., entered into a search box by typing, voice command, etc. provided in a display on a web browser, a mobile device, a web-connected printer or other suitable computing device). The server system obtains 320 webpage content (which can be one or more pages from one or more sources) based on the variable user input. The server system may include a web-search engine for obtaining the webpage content or it may employ a third-party search engine (e.g., Google search) to obtain webpage content.

The server system identifies 330 a subset of the webpage content as print content. In other words, for each webpage returned in the search results, the server system automatically identifies the portions of the webpage that are relevant to the search (e.g., filtering out unwanted content such as ads, blank space, redundant content, etc.).

The server system takes the print content and forms 340 a print-ready layout of the print content. In some embodiments, the server system generates multiple selectable options of print-ready layouts and/or print content. The server system provides 350 the print content in the print-ready layout to a client via a network connection. The client could be a display on a web browser or a mobile device (e.g., to allow previewing and/or selecting from multiple options) or it could be a printer (e.g., where the print content can be printed directly).

Figure 4:
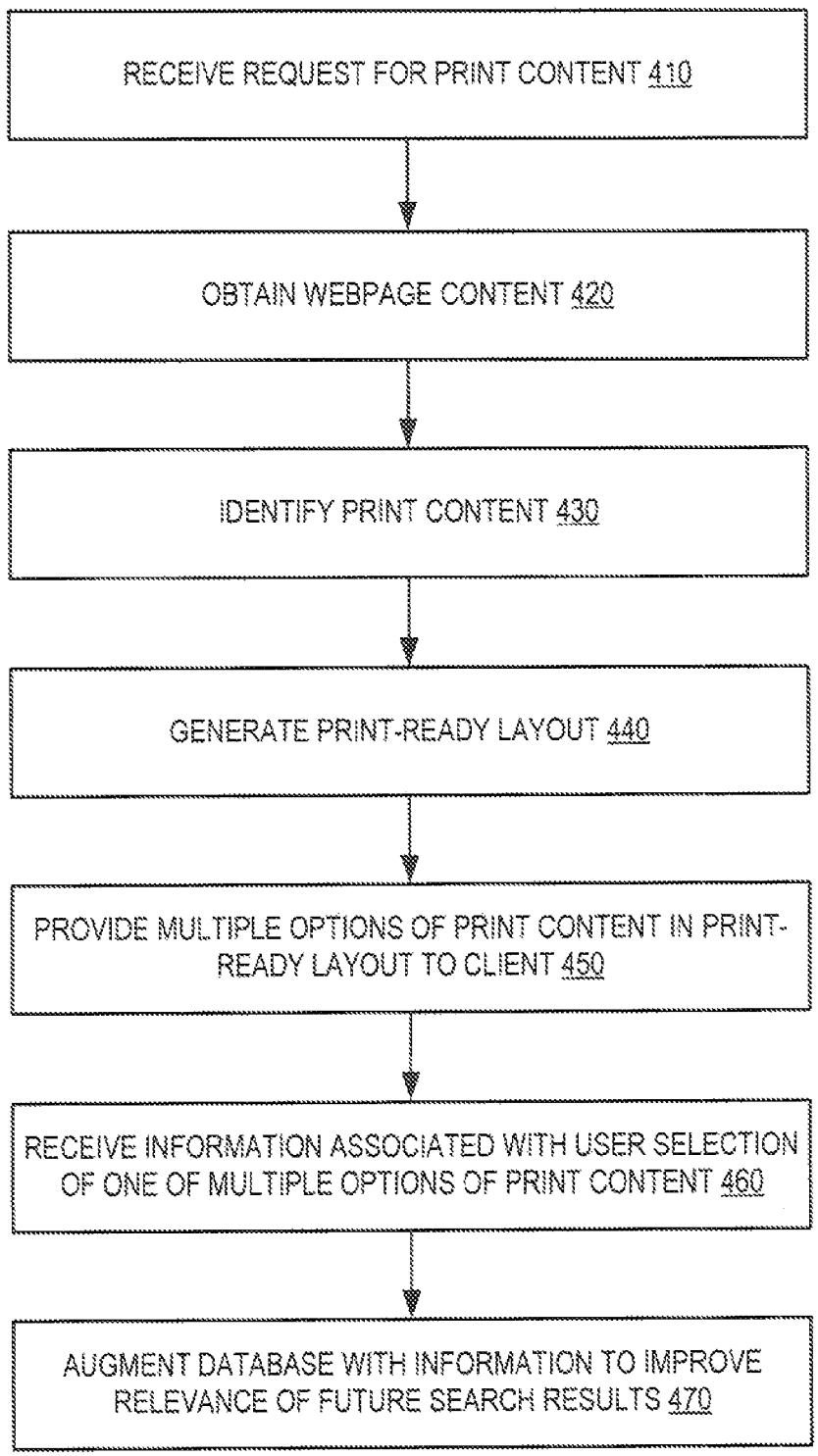
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A server system receives 410 a request for print content that includes variable user input. Based on the variable user input, the server system obtains 420 webpage content. The server system identifies 430 a subset of the webpage content as print content. In other words, for each webpage returned in the search results, the server system automatically identifies the portions of the webpage that are relevant to the search (e.g., filtering out unwanted content such as ads, blank space, redundant content, etc.).

The server system takes the print content and generates 440 multiple selectable options of print-ready layouts and/or print content. The server system provides 450 the multiple options of print content in print-ready layout form to a client via a network connection. The client could be a display on a web browser or a mobile device (e.g., to allow previewing and/or selecting from multiple options) or it could be a printer (e.g., where the print content can be printed directly).

The server system receives 460 information associated with a user's selection of one of the multiple options of print content. Based on this information, the server system augments a database of known crowd behaviors to improve the relevance and/or accuracy of future search requests.

Various modifications may be made to the disclosed embodiments and implementations of the invention without departing from their scope. Therefore, the illustrations and examples herein should be construed in an illustrative, and not a restrictive sense.

What is claimed is:

1. A method for providing print content to a client, comprising:
   receiving a request for print content at a server system, the request including variable user input;
   obtaining webpage content based at least in part on the variable user input;
   prioritizing the webpage content based on printability, printability determined by a likelihood of producing a print with a quality above a defined threshold based on location of content on the webpage, hypertext markup language (HTML) page structure, and image resolution:
   identifying a subset of the prioritized webpage content as print content;
   forming a print-ready layout of the print content; and
   providing, via a network connection, the print content in the print-ready layout to a client in response to the request,
   in which providing the print content to the client comprises providing multiple options of print-ready layouts to the client, the print-ready layouts being presented in an order based at least in part on crowed behaviors related to past selections of the multiple options of print-ready layouts.

2. The method of claim 1, wherein providing the print content in the print-ready layout comprises at least one of:
   providing the printable content for display on a display screen;
   providing the printable content in a format for printing.

3. The method of claim 1, further comprising:
   providing a web-service to the client to facilitate a user submitting the request for print content.

4. The method of claim 1, further comprising:
   receiving information associated with a user's selection of one of the multiple provided options of print content; and
   augmenting a database with the information to improve the relevance of print content provided in response to future requests for print content.

5. The method of claim 1, wherein the print-ready layout is optimized based on at least one of:
   popularity of the print content;
   printability of the print content.

6. The method of claim 1, in which forming a print-ready layout of the print content comprise creating a mash-up of content from different sources in a layout on a single page.

7. A system for providing print content to
   a client, comprising:
   a processor;
   a memory communicatively coupled to the processor, the memory comprising:
   a print request module to receive a request for print content according to search parameters submitted by a user;

a search module to obtain webpage content based at least in part on the user-submitted search parameters;

a prioritization module to prioritize the webpage content according to printability, printability determined by a likelihood of producing a print with a quality above a defined threshold based on location of content on the webpage;

a filter module to extract print content from the prioritized webpage content;

a layout module to arrange the print content in a print-ready layout; and a network interface module to provide a plurality of choices of print content in the print-ready layout to a client in response to the request.

8. The system of claim 7, in which the prioritization module further prioritizes the webpage content according to at least one of:

relevance; and popularity.

9. The system of claim 7, the layout module further to optimize the print-ready layout based on at least one of:

popularity of the print content; and printability of the print content.

10. The system of claim 7, in which the network interface module further comprises providing multiple options of print-ready layouts to the client, the print-ready layouts being presented in an order based at least in part on crowed behaviors related to past selections of the multiple options of print-ready layouts.

11. The system of claim 7, further comprising:

a database to store data associated with a user's selection of one of the plurality of choices of print content in the print-ready layout.

12. The system of claim 11, further comprising:

an accuracy module to analyze the data in the database to improve the relevance of print content provided in response to future requests for print content.

13. A non-transitory computer-readable storage medium containing instructions that, when executed, cause a computer to:

receive a request for print content via a network connection, the request including variable user input;

obtain webpage content based at least in part on the variable user input;

prioritize the webpage content base on printability, printability determined by a likelihood of producing a print with a quality above a defined threshold base on location of content on the webpage, hypertext markup language (HTML) page structure, and image resolution;

determine a subset of the prioritized webpage content as print content;

generate a print-ready layout of the print content; and provide, via the network connection, the print content in the print-ready layout to a client in response to the request, wherein obtaining webpage content based at least in part on the variable user input comprises traversing a plurality of links to a number of pages within the webpage content, and wherein providing the print content to the client comprises providing multiple options of print-ready layouts to the client, the print-ready layouts being presented in an order based at least in part on crowd behaviors related to past selections of the multiple options of print-ready layouts.

14. The computer-readable storage medium of claim 13, in which providing the print content in the print-ready layout comprises at least one of:

providing the printable content for display on a display screen;

providing the printable content in a format for printing.

15. The computer-readable storage medium of claim 13, further comprising instructions that, when executed, cause a computer to:

receive information associated with a user's selection of one of the multiple provided options of print content; and augment a database with the information to improve the relevance of print content provided in response to future request for print content.

\* \* \* \* \*

UNITED STATES PATENT AND TRADEMARK OFFICE
CERTIFICATE OF CORRECTION

PATENT NO. : 9,152,357 B2  
APPLICATION NO. : 13/032824  
DATED : October 6, 2015  
INVENTOR(S) : Hwang et al.

Page 1 of 1

It is certified that error appears in the above-identified patent and that said Letters Patent is hereby corrected as shown below:

In the claims

In column 6, line 35, in Claim 1, delete "crowed" and insert -- crowd --, therefor.

In column 6, line 55, in Claim 5, delete "content;" and insert -- content; and --, therefor.

In column 7, line 28, in Claim 10, delete "crowed" and insert -- crowd --, therefor.

In column 8, line 5, in Claim 13, delete "base" and insert -- based --, therefor.

In column 8, line 7, in Claim 13, delete "base" and insert -- based --, therefor.

In column 8, line 39, in Claim 15, delete "request" and insert -- requests --, therefor.

Signed and Sealed this  
Fifth Day of April, 2016

Michelle K. Lee  
*Director of the United States Patent and Trademark Office*